May 29, 1962     C. O. WILLIAMS     3,036,374

METAL FORMING

Filed Aug. 10, 1959     2 Sheets-Sheet 1

*INVENTOR.*
CHARLES O. WILLIAMS
BY
ATTORNEYS

May 29, 1962

C. O. WILLIAMS 3,036,374

METAL FORMING

Filed Aug. 10, 1959

INVENTOR.
CHARLES O. WILLIAMS
BY
ATTORNEYS

United States Patent Office 3,036,374
Patented May 29, 1962

3,036,374
METAL FORMING
Charles O. Williams, Alton, Ill., assignor to Olin Mathieson Chemical Corporation, East Alton, Ill., a corporation of Virginia
Filed Aug. 10, 1959, Ser. No. 832,536
12 Claims. (Cl. 29—421)

This invention relates to the coating of metals upon other metals, and more particularly to a method of coating one metal upon another by means of explosives.

Various metals, when subjected to corrosive agents, deteriorate under them. To prevent or retard the corrosive actions, the metal is usually lined or coated with other materials resistant against corrosion. Thus, for example, in the chemical industry, containers, tanks, conduits and the like which come into contact with agents such as alkali and other corrosive agents and atmospheres have applied to the surface adjacent the corrosive agents a lining of either lead, stainless steel or other metal resistant to the particular corrosive agent employed.

Heretofore, such metal linings have been applied to the surface of the metal to be protected by metalizing processes, electrolytical or electrochemical depositions, physical forming by hammering or other means of distortion, or application of the lining or coating in small or individual parts welded together in place on the surface to be protected. Generally, the metal, for example a tube to be protected, will be selected for economic considerations of relatively inexpensive metal having sufficient thickness to provide the rigidity required for the particular application. In contrast, the corrosion resistant lining is more expensive than the core metal and relatively thin, the thickness thereof being sufficient to withstand the action of the corrosive agents. Although the use of a metal lining on a core metal has been referred to specifically in the chemical industry, such linings find application in other fields, as for example in the mechanical arts employing a lining bearing metal, upon another metal, to support a moving element.

The aforesaid methods heretofore employed for coating one metal upon another have adherent disadvantages. For example, the aforesaid coating processes generally involve the dipping of the base or core metal into the protective metal in its molten form which necessitate close controls of the condition of the base metal and over the coating process itself. The absence of surface oxides, contaminants and the like is a critical factor in obtaining the desired adherence between the base metal and the protecting metal to be coated thereon.

Similar adherent disadvantages exist in the application of protective metal by physically deforming it upon the base surface of the metal to be protected. In processes involving the last principle, it is difficult to obtain intimate contact between the protecting metal and the base or core metal. An example of a process employing the last said principle involves inserting a metal tube within a second metal tube of larger diameter and then expanding the inner tube by hydraulic pressure until it is forced in close contact with the walls of the outer tube. In such a process, it is also difficult to obtain the intimacy desired between the two tubes due to the inherent recovery power of metal which causes, upon removal of the hydraulic pressure, the inner tube to spring back from the outer tube. In addition, such a process also has inherent limitations where the thickness of the inner tube is substantial, causing a prohibitive supply of power to physically deform it.

Accordingly, it is an object of this invention to eliminate disadvantages of the prior art.

Another object of this invention is to provide a novel process for more effectively and readily coating a metal member with other metals.

It is another object of this invention to provide a novel process for coating one metal on another metal with increased intimacy therebetween by use of explosives.

A further object of this invention is to provide a novel process for coating one metal upon another metal with a fusion bond thereinbetween by use of explosives.

Other objects and advantages will become more apparent from the following description and drawings in which.

According to this invention, the above objects and other objects can be obtained by driving a surface of one metal toward and against the surface of a second metal under the impact of an explosive force generated by an explosive having a specific detonating rate or velocity which causes one metal to intimately and fixedly engage the other metal. Generally, this is accomplished by placing one metal member adjacent a second metal member and activating the aforesaid explosive adjacent one of said metal members to drive it into intimate and fixed engagement with the other metal member. In accordance with this invention, it has been found that in order to obtain the required intimacy between two members, it is essential that the detonating rate or velocity of the explosive be at least about 4,000 feet per second.

Figure 8:
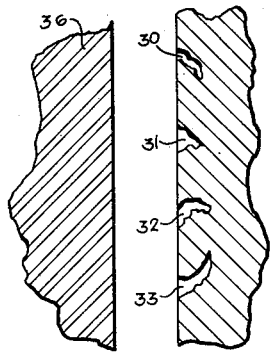
FIGURE 8 is a greatly magnified sectional view illustrating a portion of the base metal and coating metal to be applied thereon.

It has also been discovered in accordance with this invention that one metal may be coated upon another with explosives to obtain a semi-metallurgical bond therebetween wherein the one metal is secured into the other, provided the explosive has a minimum detonating rate or velocity of about at least 6,000 feet per second. It is believed the use of an explosive having a minimum detonating rate of about 6,000 feet per second to drive a metal member against another provides a bond between the two extending from a mechanical bond to a metallurgical bond. As is known, despite the degree to which the surface of a metal may be polished, the metal still retains a multitude of minute interstices extending into the metal from the polished surface. This is illustrated in FIGURE 8 in which a metal 34 has a plurality of minute interstices 30, 31, 32 and 33 extending thereinto from its polished surface 35. As is recognized, the portion of the metal 36 adjacent to the metal portion 34 will similarly contain minute interstices extending into it from its surface. However, to simplify the explanation, metal portion 36 has been illustrated as having a theoretically smooth surface with no interstices extending therefrom into the body of the metal. It has been observed that when explosives having minimum detonating velocities of 6,000 feet per second have been employed to drive the metal portion 36 against the metal portion 34, various diverse bonds have been obtained therebetween. These include mere mechanical bonds at 37 and 38 formed by the swaging or extrusion of metal portions 39 and 40 from the body of the metal 36 into the interstices 30 and 31, respectively. Mechanical bonds also result from the flow of a portion of molten metal 41 into interstice 32. This is believed to result from the dissipation of kinetic energy into heat for melting portions of metal 36. Further, it has also been observed that metallurgical bonds occur wherein portions 42 of the body of metal 36 in interstice 33 actually diffuse into and alloy with metal 34 at the walls of the interstice.

Figure 9:
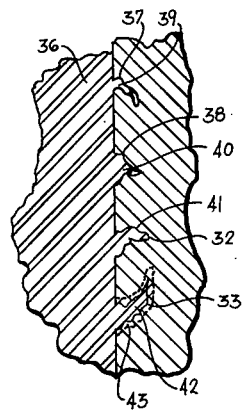
FIGURE 9 is a greatly magnified sectional view illustrating a portion of a coating metal in fixed and intimate engagement with a portion of the core metal as obtained in accordance with one embodiment of this invention.

It is believed that this results from the use of explosive having a high enough detonating velocity above the aforesaid minimum so that the kinetic energy of the explosively driven metal is converted, when the driven metal is arrested, into a different form of energy which causes portions of metals 34 and 36 to diffuse into each other at adjacent surfaces therebetween, including adjacent surfaces of the walls of interstice 33 and the portions 42, of metal 36, extruded into the aforesaid interstice 33. The zone of alloying by diffusion between the two metals is indicated generally at 43 in FIGURE 9, which figure also shows other types of bonds obtained in accordance with this invention, and referred to above, between adjacent surfaces of metals 34 and 36. Since no term is available to define this semi-metallurgical range of bonds specifically, hereinafter and in the claims, the range of bonds obtained between metals in accordance with this invention, which range extends from mechanical to metallurgical bonds, is categorized as "securing one metal into the other." Accordingly, hereinafter and in the claims, categorizing the bond obtained in accordance with this invention will embrace and will be restricted to the above-described range of bonds.

Thus, by means of this invention, it is possible to obtain a substantially perfect intimacy between metal members having application for the lining of tanks, vessels, and hollow cylinders such as conduits with a layer of protective metal. This may be accomplished by inserting a loose fitting liner with the desired metal and then fitting this loose fitting liner to the exact configuration of the containing vessel, tank, cylinder or the like. Where hollow members are employed, such as tanks or cylinders the specific explosive required by this invention is placed within the container in sufficient quantities to completely pressurize the hollow therein. As will be obvious, the selection of the particular explosive, having the minimum detonating velocity requirements of this invention, and its quantity will be governed by the ballistic requirements needed for the working of each specific combination of metal, their thicknesses and the areas of each to be engaged by the other. It is only necessary that the total area of the metal to be coated against another be equally pressurized so as to insure that the total coating metal is moved toward the base metal. The explosive forces may be applied directly to the metal or may be transmitted through a hydraulic medium, such as a liquid or an elastomer, to the coating metal for driving it against a base metal.

Where the cylinder or the tank possesses sufficient rigidity to remain undeformed under the explosive forces, the coating metal may be applied to the surfaces of the cylinder without need of any supporting fixtures. However, where the tank, cylinder or any other container or vessel does not possess sufficient rigidity to withstand deformation under the explosive force, supporting fixtures, such as an external die for support of the tanks and cylinders, are employed to prevent deformation or distortion of the tank or cylinder.

Where the tank or cylinder to be lined is large and the coating metal is thin so as not to possess rigidity to maintain its position adjacent the inner walls of the tank or hollow cylinder, the coating metal or liner may be initially anchored, by spot-welding, wedging, fasteners, and the like, at spaced points against the inner wall of the tank or hollow cylinder.

Figure 1:
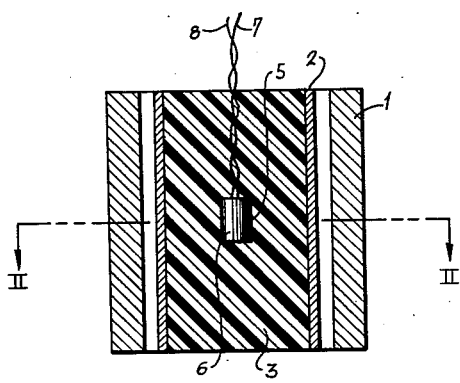
FIGURE 1 is a cross-sectional view of one embodiment of this invention illustrating the coating of one metal upon another metal.
Figure 2:
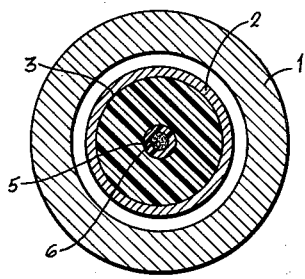
FIGURE 2 is a cross-sectional view of the same embodiment of FIGURE 1 taken along lines II—II thereof.

More specifically, by reference to FIGURE 1, the invention will be described to the lining of a hollow metal cylinder, a tube 1 of 1020 mild steel of a thickness to provide sufficient rigidity against deformation under the explosive forces to be employed in this embodiment.

The liner to be applied against cylinder 1 is a tube 2 of 5.00 inches diameter by 30.00 inches length having a .035 inch gauge fabricated of AISI type 321 stainless steel. The interior of the tube 2 is filled with a solid elastomeric material 3 for transmitting explosive forces to tube 2. Preferably, the elastomeric material is a synthetic polymer, such as any of the commercially available vinyl chloride resins formulated with an appropriate plastic dibutylphthalate, dioctylphthalate, and the like, and which are available in a full range of hardness which is an accepted measure of their resiliency.

The elastomeric material 3 is provided with an internal cavity 4 for insertion for a suitable container 5 of explosives 6. The vinyl chloride resins may be formed into a suitable plug for insertion within tube 2 by formulating the vinyl chloride with a suitable plasticizer placing the mixture into a mold where it is cured. The mold for the vinyl chloride resin will conform to the general outline of the plug desired for insertion within tube 2. In addition, the plug of elastomeric medium 3 is for convenience provided with some convenient means, such as a slit, to permit the insertion of the container 5 within cavity 4.

The container 5 for the explosive may be a conventional polyethylene bottle provided with an orifice screw-cap for entry of electrical wires 7 and 8 connected to an appropriate detonating means within container 4 for activation of the explosive therein. As will be understood, the explosive charge need not be placed within the container since it may be a solid shaped charge. Various types of explosives may be employed from which, as previously brought out, the type and quantity will be governed by the ballistic requirements needed for each specific combination of liner and the base metal provided, however, that the detonating velocity or rate thereof be at least about 4,000 feet per second. For the specific application for moving tube 2 against cylinder 1 an explosive such as ammonium nitrate is employed. The liner tube 2 with the force transmitting media and explosive contained therein was then inserted within cylinder 1. Although not shown, the assembly of FIGURE 1 may be suitably housed or supported by fixtures well known in the art, for example such as will be described subsequently in the description of FIGURE 6.

Figure 3:
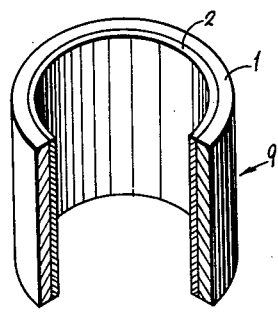
FIGURE 3 is a perspective view in section illustrating the engagement between metal obtained in accordance with the embodiment of FIGURE 1.

In operation, the explosive charge 6 is initiated by making an appropriate electrical contact across leads 7 and 8. The resultant force of the activated explosive causes the elastomeric media to expand to transmit the explosive forces to the liner tube thereby driving the tube against the inner walls of cylinder 2 in intimate and fixed engagement therewith. The resultant lined article indicated generally as 9 is illustrated in FIGURE 3 with the cylinder 1 having its inner walls lined with tube 2. Although a metal hollow cylinder 2 having straight inner walls has been referred to specifically, it is to be understood that the invention is equally applicable to hollow cylinders, tubes, tanks, and the like, having inner walls of varied contours. The inner walls may be provided with recesses, crevices, protrusions and/or other configurations. The use of explosives having the minimum velocity rates of this invention drives the liner against the inner walls into intimate engagement with the surface of the base metal to be coated with substantially no spring-back of the lining to detract from the intimacy obtained between the liner and the surface of the base metal.

Figure 4:
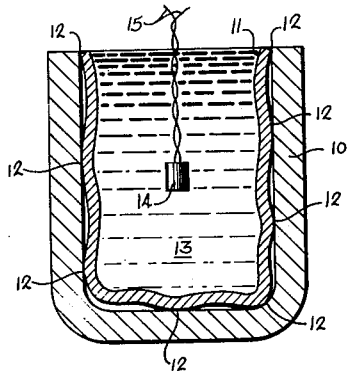
FIGURE 4 is a cross-sectional view illustrating another embodiment of this invention for coating one metal on another metal.

FIGURE 4 illustrates another embodiment of this invention employing another aspect thereof for securing a lining into the inner walls of a cylindrical cup-shaped metal member 10 having sufficient thickness to prevent deformation thereof under the explosive forces employed in coating it with the metal liner 11. Liner 11 is also a hollow cup-shaped cylinder, however, having insufficient thickness to provide the necessary rigidity for maintaining its configuration adjacent the inner walls of the cup-shaped member 10. Accordingly, the liner 11 is supported adjacent inner walls of cup-shaped member 10 by supporting it at spaced points 12 to the inner wall of member 10. As indicated previously, such support of the liner 11 may be obtained by means of spot-welds, fixtures, wedging, and the like. The interior of the cup-shaped liner 11 is then filled with a liquid 13, such as water, and an explosive 14 submerged therein in any convenient manner, such as suspension by means of lead wires 15. However, in this embodiment, in order to obtain a higher degree of engagement between the liner and the inner walls of member 10 so that one is secured into the other, an explosive such as PETN having a minimum detonating velocity of at least about 6,000 feet per second is employed, as for example PETN which has a detonating velocity of about 25,000 feet per second.

Figure 5:
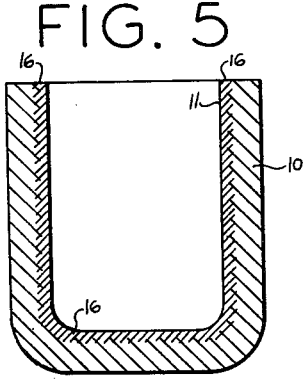
FIGURE 5 is a cross-sectional view illustrating a fusion bond obtained between metal members in accordance with the embodiment of FIGURE 4.

Use of explosives having such a minimum detonating velocity enables the driving of the liner 11 against the inner walls of hollow member 10 with explosive violence to secure the liner therein. In order to obtain the securement of the liner into the hollow member 10, it is only necessary that it be spaced only a small distance therefrom. The specific spacing or gap between the liner and hollow member 10 is not critical provided an explosive having a minimum detonating rate or velocity of 6,000 feet per second is employed to drive the lining at an explosive rate. The cup-shaped member 10 having the liner 11 secured in its inner walls is shown in FIGURE 5 with the bond indicated at 16. As pointed out above, bond 16 may range from a mechanical bond to a metallurgical bond depending upon what degree the explosive employed exceeds the minimum detonating velocity of about at least 6,000 feet per second.

Figure 6:
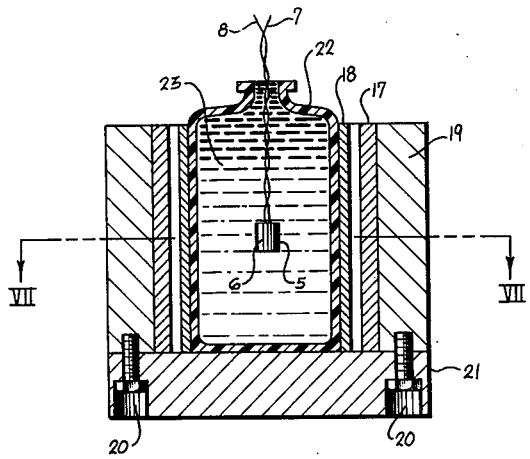
FIGURE 6 is a cross-sectional view illustrating a still further embodiment of this invention.
Figure 7:
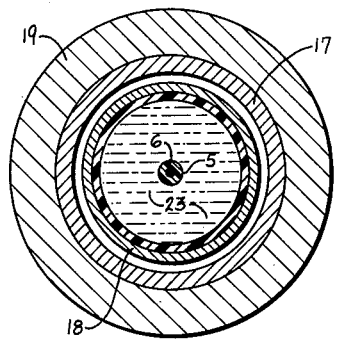
FIGURE 7 is a cross-sectional view taken along lines VII—VII of the embodiment of FIGURE 6.

FIGURE 6 illustrates an embodiment of this invention in which a hollow cylinder 17 is employed having insufficient rigidity to withstand deformation under the explosive forces for applying on its inner walls a metal liner 18. In order to restrain the hollow cylinder 17 from distortion, it is placed within a hollow cylindrical restraining die 19 in abutting engagement with the inner walls thereof. Restraining die 19 is fixedly mounted by means of a bolt 20 on a supporting base 21. Liner 18 is then placed within hollow cylinder 17 on supporting base 21. Thereafter an elastic bag 22 or any other suitable container or envelope is then inserted within liner 18 for containment of a hydraulic liquid 23, such as water, therein, with the filled container being supported on base 21. An explosive 6 having the aforesaid detonating rate of 6,000 feet per second and contained within a suitable container 5 is submerged in the liquid by means of lead wires 7 and 8. As with the preceding embodiment of FIGURE 1, the activation of the explosive drives liner 18 against the inner walls of cylinder 17 in fixed and intimate engagement therein to obtain a resultant article illustrated in FIGURE 3.

Although the invention has been described with reference to specific embodiments, materials and details, various modifications and changes within the scope of this invention will be apparent to one skilled in the art and are contemplated to be embraced within the invention.

What is claimed is:

1. A method of lining a hollow metal member comprising placing a metal lining adjacent to and coextensive with the inner wall of said container whereby one surface of a pair of opposite surfaces of said lining is disposed adjacent said inner wall; placing a hydraulic pressure transmitting medium having an explosive disposed therein in contiguous relationship with the other of said opposite surfaces with said explosive having a detonating velocity of about at least 4,000 feet per second; and driving said lining against said wall by activating said explosive to generate an explosive force to drive said lining into intimate and fixed engagement with said wall.

2. The method of claim 1 wherein said lining is a second container having a configuration conforming to the hollow of and of a size to be placed within the first said container and said medium is contained in said second container.

3. The method of claim 1 wherein said lining is secured at spaced points to said wall prior to generation of said force.

4. The method of claim 1 wherein said medium is a liquid contained in a pliable bag.

5. A method of coating a first metal member on a hollow metal core member adapted to contain a liquid comprising placing said first metal member adjacent said core member to dispose one surface of a pair of opposite surfaces of said first metal member adjacent the inner wall of said core member, placing a hydraulic medium in contiguous relationship with the other of said opposite surfaces of said first metal member, positioning within said medium an explosive having a detonating velocity of about at least 6,000 feet per second, and driving said first metal member against said inner wall of said core member by the force resulting from activating said explosive whereby said first metal is driven into securement in said wall.

6. The method of claim 5 wherein said first metal member is secured at spaced points to said core member prior to activation of said explosive.

7. The method of claim 5 wherein said medium is a liquid contained in a pliable bag.

8. A method of lining a hollow container comprising placing a metal lining adjacent to and coextensive with the inner wall of said container to dispose one of a pair of opposite surfaces of said lining adjacent the surface of said inner wall, placing a hydraulic medium adjacent the other of said opposite surfaces of said lining and in contiguous relationship with said other surface, positioning an explosive having a detonating velocity of about at least 6,000 feet per second within said medium to generate force for driving said lining into securement in said wall, and driving said lining against said wall by activating said explosive to generate an explosive force to drive said lining in securement into said wall.

9. The method of claim 8 wherein said lining is secured at spaced points to said wall prior to activation of said explosive.

10. The method of claim 8 wherein said medium is a liquid contained in a pliable bag.

11. A method of lining a hollow cylinder comprising inserting a first hollow member in annular arrangement within a second cylinder with said first cylinder being adapted to contain a hydraulic pressure transmitting medium; placing said medium having an explosive disposed therein within and in contiguous relationship with said first cylinder with said explosive having a detonating velocity of about at least 6,000 feet per second; and driving said first cylinder against said second cylinder by activating said explosive to drive said first cylinder into securement with said second cylinder.

12. A method of lining a hollow cylinder comprising inserting a first hollow metal cylinder in annular arrangement within a second cylinder with said first cylinder being adapted to contain a hydraulic pressure transmitting medium; placing said medium having an explosive disposed therein within and in contiguous relationship with said first cylinder with said explosive having a detonating velocity of about at least 4,000 feet per second; and driving said first cylinder against said second cylinder by activating said explosive to generate an explosive force to drive said first cylinder into intimate and fixed relationship with said second cylinder.

References Cited in the file of this patent

UNITED STATES PATENTS

| | | |
|---|---|---|
| 1,286,382 | Mead | Dec. 3, 1918 |
| 2,214,226 | English | Sept. 10, 1940 |
| 2,367,206 | Davis | Jan. 16, 1945 |
| 2,412,886 | Huston | Dec. 17, 1946 |
| 2,779,279 | Maiwurm | Jan. 29, 1957 |

FOREIGN PATENTS

| | | |
|---|---|---|
| 766,741 | Great Britain | Jan. 23, 1957 |